(12) United States Patent
Kashiwagi et al.

(10) Patent No.: US 11,514,083 B2
(45) Date of Patent: Nov. 29, 2022

(54) DATA PROCESSING SYSTEM AND DATA PROCESSING METHOD

(71) Applicant: NIPPON TELEGRAPH AND TELEPHONE CORPORATION, Tokyo (JP)

(72) Inventors: Keiichiro Kashiwagi, Musashino (JP); Hisaharu Ishii, Musashino (JP); Yui Yoshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 6 days.

(21) Appl. No.: 16/471,447

(22) PCT Filed: Dec. 21, 2017

(86) PCT No.: PCT/JP2017/045941
§ 371 (c)(1),
(2) Date: Jun. 19, 2019

(87) PCT Pub. No.: WO2018/117218
PCT Pub. Date: Jun. 28, 2018

(65) Prior Publication Data
US 2020/0192916 A1   Jun. 18, 2020

(30) Foreign Application Priority Data

Dec. 22, 2016   (JP) .............................. JP2016-249723

(51) Int. Cl.
*G06F 7/00* (2006.01)
*G06F 16/00* (2019.01)
(Continued)

(52) U.S. Cl.
CPC .......... *G06F 16/285* (2019.01); *G06F 16/168* (2019.01); *G06F 16/1824* (2019.01); *G06F 16/245* (2019.01); *G06F 16/248* (2019.01)

(58) Field of Classification Search
CPC .. G06F 16/285; G06F 16/245; G06F 16/1824; G06F 16/168; G06F 16/248; G06F 16/43; G06F 2212/1041; G06F 12/0638
(Continued)

(56) References Cited

U.S. PATENT DOCUMENTS

2002/0049731 A1* 4/2002 Kotani .................... G06F 16/58
2002/0055943 A1* 5/2002 Kusama ................. G06F 16/10
(Continued)

FOREIGN PATENT DOCUMENTS

EP    1463325 A2    9/2004
JP    2008024385 A  2/2008
(Continued)

OTHER PUBLICATIONS

International Preliminary Report on Patentability, including the English translation of the Written Opinion, regarding PCT/JP2017/045941, dated Jul. 4, 2019.
(Continued)

*Primary Examiner* — Tuan A Pham
(74) *Attorney, Agent, or Firm* — Harness, Dickey & Pierce, P.L.C.

(57) ABSTRACT

A data processing system according to one embodiment includes first and second data storage devices having a storage medium capable of permanently storing data; a data holding device having a storage medium capable of storing the data at a higher speed than the first and second data storage devices; and a controller that determines the type of data to be processed, and, in the case where the data to be processed is structured data, stores the data to be processed
(Continued)

in the data holding device, then, collectively, in the first data storage device, and, in the case where the data to be processed is binary data, stores the data to be processed in the data holding device and in the second data storage device.

13 Claims, 4 Drawing Sheets

(51) Int. Cl.
    *G06F 16/28*       (2019.01)
    *G06F 16/245*     (2019.01)
    *G06F 16/182*     (2019.01)
    *G06F 16/16*       (2019.01)
    *G06F 16/248*     (2019.01)

(58) Field of Classification Search
    USPC .......................................................... 707/722
    See application file for complete search history.

(56) References Cited

U.S. PATENT DOCUMENTS

| | | | |
|---|---|---|---|
| 2003/0004976 A1* | 1/2003 | Enokida | G06F 16/58 |
| 2008/0288716 A1* | 11/2008 | Arakawa | G06F 12/0246 |
| | | | 711/103 |
| 2009/0207443 A1* | 8/2009 | Kimura | G06F 3/1204 |
| | | | 358/1.15 |
| 2012/0317337 A1* | 12/2012 | Johar | G11C 16/349 |
| | | | 711/E12.008 |
| 2014/0089257 A1* | 3/2014 | Ignacio | G06F 16/214 |
| | | | 707/609 |
| 2014/0365861 A1* | 12/2014 | Lasmarias | G06F 9/54 |
| | | | 715/234 |
| 2016/0210306 A1* | 7/2016 | Kumarasamy | G06F 16/164 |
| 2017/0062041 A1* | 3/2017 | Kataoka | G06F 13/1694 |
| 2017/0286436 A1* | 10/2017 | Neporada | G06F 3/061 |

FOREIGN PATENT DOCUMENTS

| | | |
|---|---|---|
| JP | 2009-265840 A | 11/2009 |
| JP | 2010-227326 A | 10/2010 |
| JP | 2010-271862 A | 12/2010 |
| JP | 2015007875 A | 1/2015 |
| JP | 2015-026167 A | 2/2015 |
| JP | 5948399 B2 | 7/2016 |
| WO | WO-2015165545 A1 | 11/2015 |

OTHER PUBLICATIONS

Nobuhiko Matsuura, Maki Ohata et al., "A Proposal of the Distributed Data Management System for Large-scale Sensor Data", Information Processing Society of Japan, vol. 54, No. 2, Feb. 2013, p. 721-p. 729.

Japanese Office Action (in English and Japanese) issued in Japanese Patent Application No. 2018-558067, dated Apr. 2, 2019.

International Search Report (in English and Japanese) issued in PCT/JP2017/045941, dated Mar. 13, 2018; ISA/JP.

CA Japanese Office Action regarding JP2018558067, dated Aug. 6, 2019.

* cited by examiner

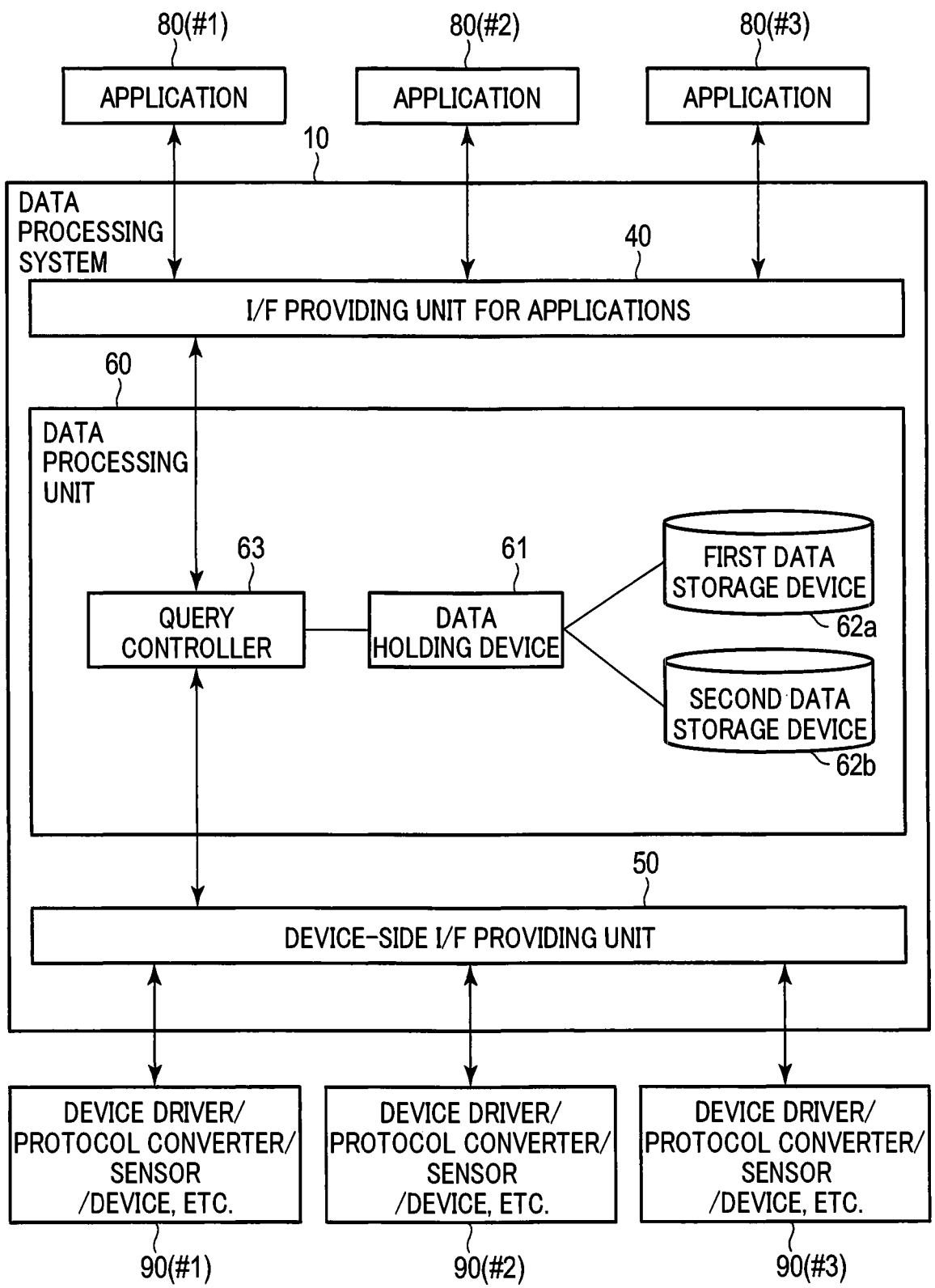
F I G. 1

DATA PROCESSING SYSTEM AND DATA PROCESSING METHOD

CROSS-REFERENCE TO RELATED APPLICATIONS

This is a U.S. National Phase Application under 35 USC 371 of International Application PCT/JP2017/045941 (not published in English), filed Dec. 21, 2017, which claims priority to Japanese Patent Application No. 2016-249723, filed on Dec. 22, 2016. The entire disclosures of the above applications are incorporated herein by reference.

FIELD

The embodiments of the present invention relate generally to a data processing system and a data processing method.

BACKGROUND

In recent years, the Internet of Things (IoT), which connects various sensors, devices, and networks to utilize data, has been attracting attention. In the IoT, data is continuously collected from various sensors and devices, etc. Therefore, a database system that accumulates large volumes of small pieces of time-series data is required.

In addition to the sensor data, an application that performs failure prediction, etc. involved with use of IoT, uses data such as images captured by a camera. Characteristics of data such as images are different from general sensor data characteristics. Data related to images, etc., is binary data. Binary data is data with a large file size, and is not structured.

Based on the above characteristics, data processing systems suitable for IoT are required to select the most appropriate method of data accumulation based on the type of data involved.

In general examples of IoT utilization, analysis, prediction, actuation, etc., are performed based on the most recent data acquired from a device or sensor. Therefore, the following (1) and (2) are the characteristics of the system.

(1) Data is frequently written to the storage device in chronological order.

(2) Values belonging to the latest classification in time-series is frequently referred to among all data.

A typical example of IoT system usage is abnormality detection, which is based on an analysis using data stored (recorded and accumulated) on a long-term basis and a real-time analysis. Therefore, the following (1) and (2) are required (for example, see Non-Patent Document 1).

(1) Permanently accumulate sensor data in association with time-series data, and perform processing in bulk.

(2) Acquire latest data at high speed.

Based on the above requirements, a system for IoT is required to be a data processing system that achieves both permanent accumulation of data associated with time-series data and high-speed acquisition of the latest data. Current data processing systems are configured by the following (1) and (2), as in the configuration of a general computer.

(1) A storage device whose capacity is generally large, as in a hard disk, etc., and that is capable of permanently storing data; however, that does not have a relatively high data reading speed.

(2) A data holding device that has a relatively high data reading speed, as in a cache provided in a memory, etc.; however, whose capacity is generally small, and that does not permanently store data.

SUMMARY

A general data processing system has a mechanism for holding an index in a memory in order to increase a data search speed. However, the number of indexes increases according to the number of data. Therefore, in the case of handling an extremely large number of data, such as sensor data, generating an index becomes a bottleneck upon data writing, and causes a problem that the data size of the index exceeds the data size storable in the memory.

Furthermore, regarding the sensor data, the value of the latest classification is frequently referred to (read). Therefore, even if indexes are generated for all data, most of such indexes are not referenced. Therefore, the index has less effect on increasing the speed.

Furthermore, a general data processing system has a mechanism for increasing the reading speed of the same data using a cache. However, it is not realistic to have the latest value of large amounts of the sensor data held in the cache that has limited capacity. Furthermore, regarding the sensor data whose latest values are constantly updated in chronological order, the same data is referred to less frequently. Therefore, using the cache has less effect on increasing the reading speed.

Due to these problems of writing and reading, it has been difficult to achieve both high-speed processing of sensor data and perpetuation of stored data by a conventional configuration that simply uses a database that uses an index and a cache.

Furthermore, binary data such as images is characterized in not being structured and having a large file size. Therefore, if the binary data is stored in the same database as the sensor data, since the file format needs to be converted, it would be difficult to achieve high-speed writing and reading.

Furthermore, in the data processing system, due to the change of the device connection configuration and the change of the application requirement, the data model is updated, which would likely cause inconsistency among the application, the device, an interface (I/F) of the data processing system, and setting information. This increases the management load for maintaining the consistency of the I/F of the entire system.

In the above manner, in the field of IoT, a larger amount of sensor data is required to be processed than in a conventional device. Furthermore, since both long-term analysis and real-time analysis may become processing targets, permanent accumulation of time-series data, and high-speed and frequent reading of the latest value of data are respectively required. In addition, a mechanism to accumulate both structured data having a small data size, such as sensor data, and binary data having a large data size (larger data size compared to the structured data), such as image data, is required.

In the conventional data processing system, it is difficult to achieve both improvement in writing speed and reading speed and permanence of stored data for a large amount of structured data in time-series and binary data.

The present invention has been made in view of such circumstances, and an object thereof is to provide a data processing system and a data processing method capable of achieving both improvement in the access speed of data and the permanence of stored data.

In order to achieve the above object, an aspect of the data processing system according to the embodiment of the present invention provides a system including first and second data storage devices including a storage medium capable of permanently storing data; a data holding device having a storage medium capable of storing the data at a higher speed than the first and second data storage devices; and a controller that determines the type of data to be processed, and, in the case where the data to be processed is structured data, stores the data to be processed in the data holding device, then, collectively, in the first data storage device, and, in the case where the data to be processed is binary data, stores the data to be processed in the data holding device and in the second data storage device.

According to the present invention, it is possible to achieve both improvement in the access speed of data and permanence of stored data.

BRIEF DESCRIPTION OF THE DRAWINGS

FIG. 1 is a diagram showing a first configuration example of a data processing system according to an embodiment of the present invention.

DETAILED DESCRIPTION

Hereinafter, a data processing system to which a data processing method according to an embodiment of the present invention is applied will be explained with reference to the drawings.

The present embodiment focuses on that, in the IoT field, there are many applications that periodically perform state monitoring, etc., and that data of the latest time is frequently read in the data search. In the present embodiment, by holding data of the latest time in a data holding device, it is possible to read the data at high speed.

In the conventional general configuration, frequently accessed data is held in the data holding device, such as a cache on a memory, and the latest data is not necessarily stored in the data holding device.

In this case, it is necessary to read data from a data storage device that permanently stores data, such as from a hard disk. Since the reading speed of the data from the data storage device is slower than the reading speed of the data from the data holding device, it takes more time to read the latest data.

Therefore, in the present embodiment, the data processing system first writes data received from a device, etc., into a data holding device, such as a cache provided in a memory or a memory in a kernel space of an operating system (OS). The data processing system then writes this data and time-series information into the data storage device. In this manner, the data is permanently stored in the data storage device in association with time-series data, which allows the latest data to be referred to at high speed.

FIG. 1 is a diagram showing a first configuration example of the data processing system according to an embodiment of the present invention.

As shown in FIG. 1, a data processing system (data accumulation/processing system) 10 in the embodiment includes an I/F providing unit for applications (first interface providing unit) 40, a device-side I/F providing unit (second interface providing unit) 50, and a data processing unit 60.

Each unit in the data processing system 10 can be realized by a device serving as a computer device, such as a personal computer (PC). For example, the computer device includes a processor such as a central processing unit (CPU), a volatile memory connected to the processor, a nonvolatile memory, and a communication interface, etc. The processor executes a program stored in the nonvolatile memory for each unit of the data processing system 10 to realize various processes.

Figure 2:
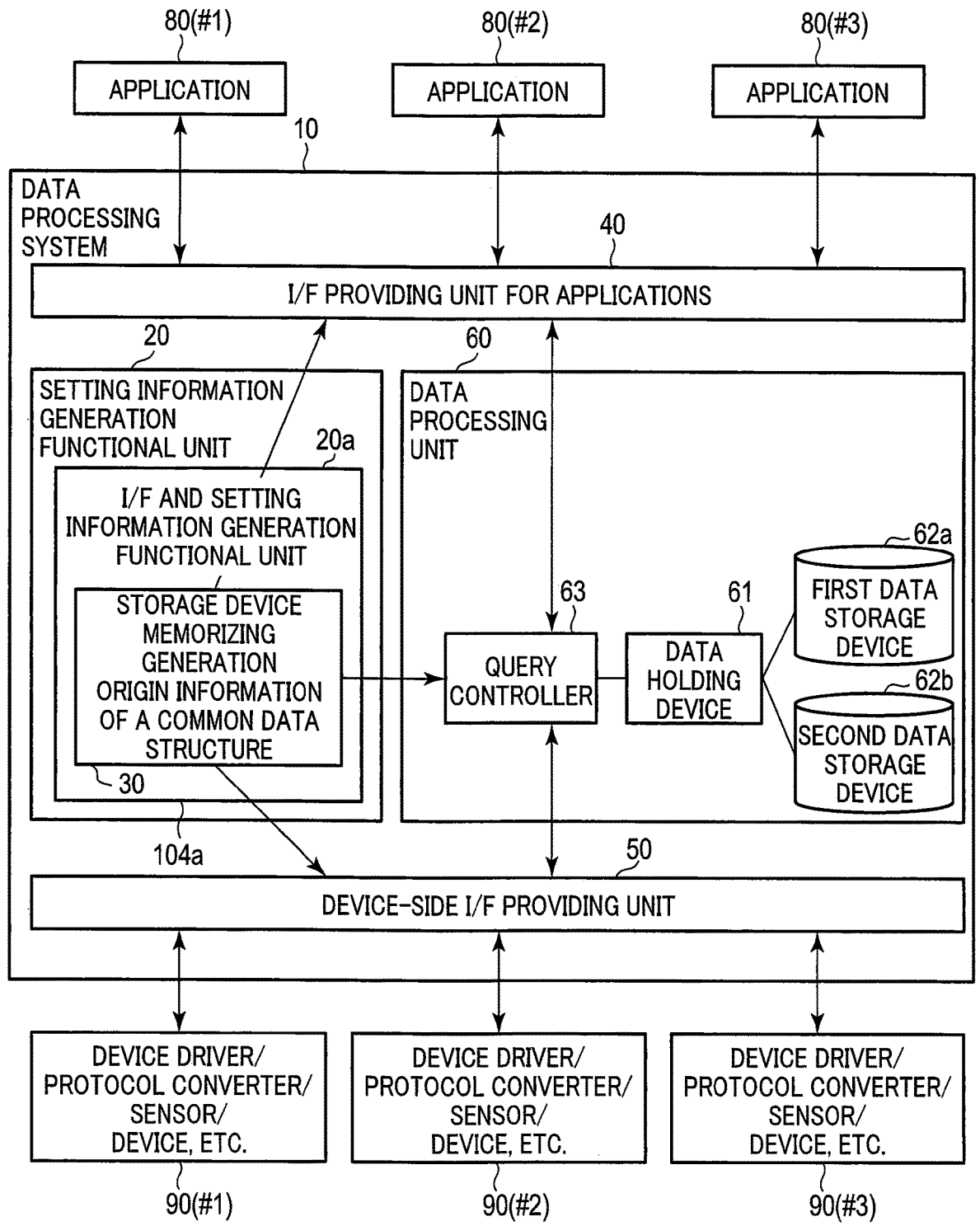
FIG. 2 is a diagram showing a second configuration example of the data processing system according to an embodiment of the present invention.

FIG. 2 is a diagram showing a second configuration example of the data accumulation processing system according to an embodiment of the present invention.

In the example shown in FIG. 2, the data processing system 10 further includes a setting information generation functional unit (setting information generation unit) 20 in addition to the configuration explained in FIG. 1. The setting information generation functional unit 20 includes an I/F and setting information generation functional unit 20a.

The I/F and setting information generation functional unit 20a includes a storage device memorizing generation origin information of a common data structure 30 that stores generation origin information of a common data structure or a file describing the generation origin information of a common data structure.

The generation origin information of a common data structure is common information from which (1) an application program (also referred to as an application or an APP), (2) a device-side I/F, (3) an application programming interface (API), (4) setting information for the data processing units, and (5) various I/F, etc. are generated.

The generation origin information of a common data structure may be a csv file defining a class, an attribute, or a relation, and a json file defining a relation between instances.

Hereinafter, the setting information generation functional unit 20, the I/F providing unit for applications 40, the device-side I/F providing unit 50, and the data processing unit 60 will each be explained.

The I/F providing unit for applications 40 has a function of providing an interface for an application 80, such as an API, to the application 80.

The data processing unit 60 includes a data holding device 61, a first data storage device 62a, a second data storage device 62b, and a query controller 63.

The query controller 63 has a function of processing a request to perform data reference (acquisition), etc., input from an application, etc. The query controller 63 has a function of determining data accumulated in the data holding device 61, the first data storage device 62a, or the second data storage device 62b, or the type of data requested by the query.

In accordance with the result of this determination, the query controller 63 has a function of interacting among one of the data holding device 61, the first data storage device 62a, and the second data storage device 62b to accumulate or acquire data to be processed.

The data holding device 61 has a storage medium such as a nonvolatile memory capable of storing data. Under the same cost condition, the storage capacity of the storage medium of the data holding device 61 is smaller than the storage capacity of the storage medium of the first data storage device 62a and the storage medium of the second data storage device 62b.

Due to the characteristics of this storage medium, the data holding device 61 has a function of reading data from this storage medium at high speed, and a function of saving new data in the storage medium.

The first data storage device 62a has a storage medium such as a nonvolatile memory that is capable of permanently storing data. Due to the characteristics of this storage medium, the data holding device 61 has a function of permanently accumulating data that is not binary data in this storage medium, and a function of reading data that is not binary data at high speed from this storage medium.

The second data storage device 62b has a storage medium such as a nonvolatile memory capable of permanently storing data. Due to the characteristics of this storage medium, the data holding device 61 has a function of permanently accumulating binary data in this storage medium, and a function of reading binary data at high speed from this storage medium.

The storage medium of the data holding device 61 is characterized in being able to write data at a higher speed or read data at a higher speed than the storage medium of the first data storage device 62a and the storage medium of the second data storage device 62b.

The device-side I/F providing unit 50 has a function of providing interfaces for applications of a device driver/protocol converter/sensor/device, etc. 90, such as an API, to the device driver/protocol converter/sensor/device, etc. 90. The "device driver/protocol converter/sensor/devices, etc." may sometimes be collectively referred to as a device.

When accumulating the data input from the device driver/protocol converter/sensor/device, etc. 90 in the data processing unit 60, the query controller 63 of the data processing system 10 determines the type of data to be processed by the data processing unit 60, that is, the type of data to be accumulated in the data holding device 61, the first data storage device 62a, or the second data storage device 62b inside the data processing unit 60. When this data is structured data, the query controller 63 writes the structured data into the data holding device 61 (not accumulated permanently).

Furthermore, the query controller 63 permanently accumulates the structured data, information serving as a search key for the data, and time information in the first data storage device 62a via the data holding device 61. The permanence of the structured data is thereby maintained.

Furthermore, when the determined data is not structured data but binary data, the query controller 63 accumulates the binary data in the data holding device 61, and permanently accumulates the binary data accumulated in the data holding device 61 in the second data storage device 62b. The permanence of the binary data is thereby maintained.

When the query controller 63 accumulates the binary data in the second data storage device 62b via the data holding device 61, the query controller 63 may include in a file name, etc. of the binary data accumulated in this second data storage device 62b, information serving as a key (key information) when searching binary data, such as a class name, an instance ID, and a time stamp. When acquiring the binary data later on from the second data storage device 62b, this allows the query controller 63 to use this key information to acquire the binary data from the second data storage device 62b via the data holding device 61.

Similarly, when the query controller 63 accumulates the binary data in the second data storage device 62b, the query controller 63 may write information of the storage destination of this binary data (file path of the second data storage device 62b, etc.) into the data holding device 61 or the first data storage device 62a via the same route as the structured data. This allows the query controller 63 to search the information of the storage destination of the binary data by using the above key information, and to acquire information of this storage destination at high speed.

Furthermore, based on the generation origin information of a common data structure stored in the storage device memorizing generation origin information of a common data structure 30, the I/F and setting information generation functional unit 20a in the setting information generation functional unit 20 may generate data type setting information, the I/F for applications, the device-side I/F, or a part thereof so as to have consistency.

The query controller 63 may determine the type of data by using the data type setting information generated based on the generation origin information of a common data structure stored in the storage device memorizing generation origin information of a common data structure 30.

Furthermore, by constantly overwriting a data set already stored in the data holding device 61 by the latest data set that is frequently referred to in the structured data, the query controller 63 is capable of reading the new structured data in time-series at high speed.

At the time of data reading, the type of data requested to be read is determined. In the case where this type is structured data such as json, the query controller 63 first searches the data holding device 61 using key information for searching the structured data, such as by using a class name, an instance ID, and a time stamp, and searches the first data storage device 62a via the data holding device 61 in the case where the data is not stored in the data holding device 61.

On the other hand, in the case where the determined type is binary data, the query controller 63 first searches the data holding device 61 using key information for searching the binary data, and searches the second data storage device 62b via the data holding device 61 in the case where the data is not stored in the data holding device 61.

The processing performed by the data processing system in the embodiment of the present invention will be described.

The data processing unit 60 is capable of automatically generating the I/F for applications, the device-side I/F, and the data type setting information.

The generation origin information of a common data structure stored in the storage device memorizing generation origin information of a common data structure 30 may be, for example, (1) a csv file defining class/attribute/relations, etc., and (2) a json file defining a relation between instances.

Based on the generation origin information of a common data structure stored in the storage device memorizing generation origin information of a common data structure 30, the I/F and setting information generation functional unit 20a may generate (1) the data type setting information representing the correspondence relationship of the data types, (2) the I/F for applications such as REST API, and (3) the device-side I/F such as MQTT API, or a part thereof.

The correspondence relationship of data types is, for example, (1) the correspondence relationship between class names and binary data, or (2) the correspondence relationship between class names and structured data (json, etc.).

The endpoint of the REST API, which is an example of the I/F for applications, may be "/class name/instance ID/time stamp". The topic name of the MQTT API, which is an example of the device-side I/F, may be "/class name/instance ID/time stamp".

Based on the above data type setting information generated on the basis of the generation origin information of a common data structure, the I/F and setting information generation functional unit 20a may integrally generate the I/F for applications of when referring to data inside the data processing unit 60 (for example, the endpoint of the REST API) and the device-side I/F (for example, the topic name of the MQTT API) as an I/F maintaining consistency.

Also, based on the information such as the class name of an HTTP request and the data type setting information, the query controller 63 selects a database, etc., having an appropriate property according to the type of the data, and writes and reads the data among the data holding device 61, the first data storage device 62a, and the second data storage device 62b.

Figure 3:
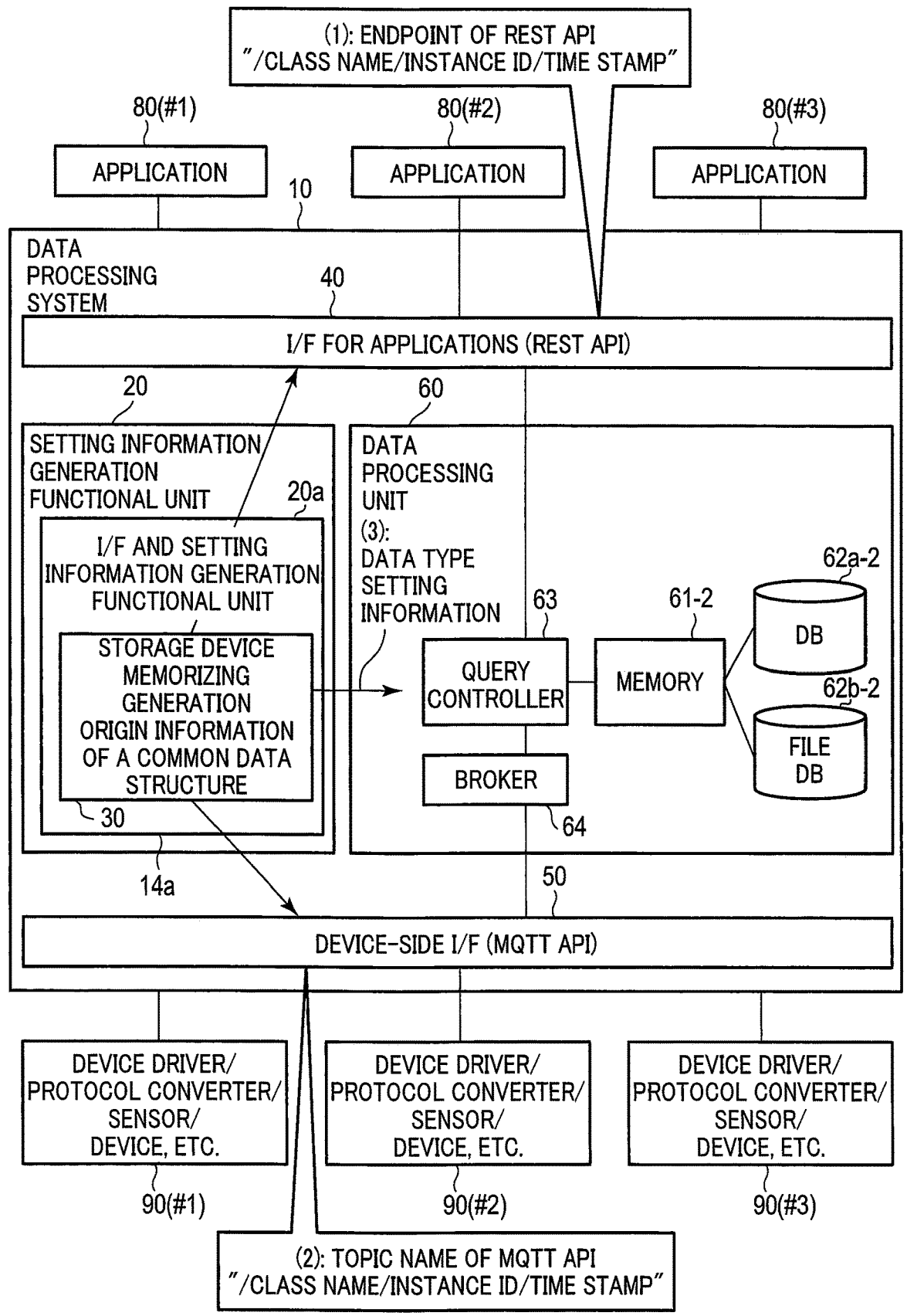
FIG. 3 is a diagram for explaining the processing by the data processing system according to an embodiment of the present invention.

FIG. 3 is a diagram for explaining processing by a data processing system according to an embodiment of the present invention.

With reference to FIG. 3, the processing at the time of data accumulation will be explained. In the example shown in FIG. 3, the data holding device 61, the first data storage device 62a, and the second data storage device 62b explained with reference to FIG. 1 correspond one-on-one to a memory 61-2, a database (DB) 62a-2, and a file DB 62b-2. The DB 62a-2 collectively stores structured data having a smaller data size than that of binary data stored in the file DB 62b-2. The file DB 62b-2 individually stores binary data having a larger data size than that of the structured data stored in the DB 62a-2. Furthermore, in the example shown in FIG. 3, a broker 64 is provided between the query controller 63 and the device-side I/F providing unit 50. The broker 64 exchanges data between the query controller 63 and the device-side I/F providing unit 50.

The query controller 63 compares data type setting information with information such as a class name included in a header in an HTTP request which is a request for accumulating data input from a device driver/protocol converter/sensor/device, etc. 90. As a result of this collation, the query controller 63 determines from the device driver/protocol converter/sensor/device, etc. 90, a target to be accumulated in the data holding device 61, the first data storage device 62a, and the second data storage device 62b inside the data processing unit 60, that is, the type of data to be processed by the data processing unit 60.

As a result of the determination, in a case where the above data to be accumulated is structured data described in the form of json, etc., the query controller 63 writes the data in the memory 61-2, classifies the data written in the memory 61-2 on the basis of the setting information generated from the generation origin information of a common data structure, and collectively writes the classified data together with one or more key information for acquiring the data and value information (measurement data that is an accumulation target) in the DB 62a-2.

When the above data to be accumulated is binary data such as an image, the query controller 63 accumulates this binary data in the memory 61-2, classifies the data written in the memory 61-2 for each device generating the data based on the generation origin information of a common data structure, and individually writes the classified data into the file DB 62b-2 in a binary format and in a form that can be searched by key information.

Figure 4:
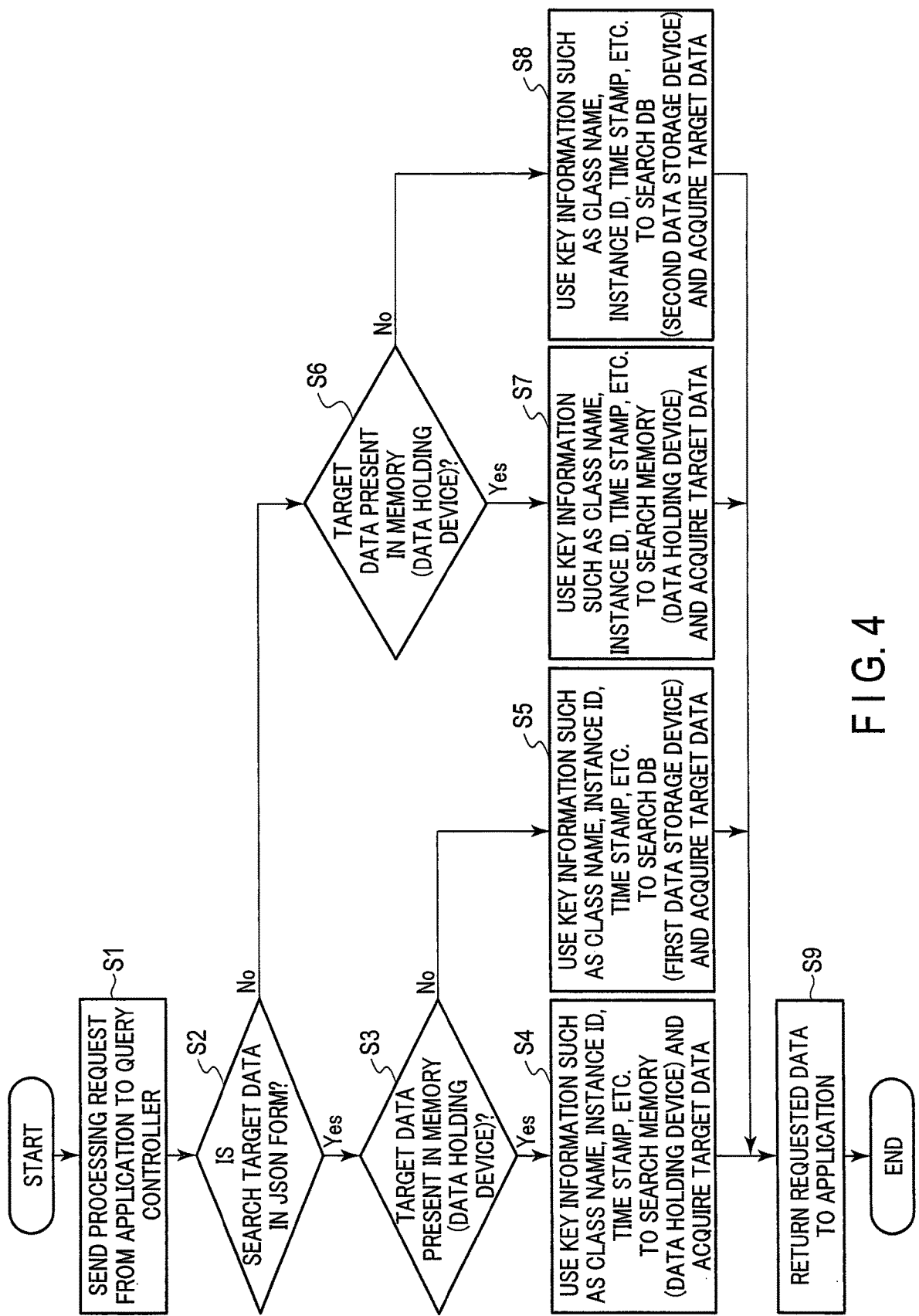
FIG. 4 is a flowchart explaining processing performed upon data reference (search) in the data processing system according to an embodiment of the present invention.

With reference to FIG. 3 and FIG. 4, the processing at the time of performing data reference (search) will be explained.

When a data acquisition request (HTTP, etc.) input from the application is sent to the query controller 63 (S1), the query controller 63 compares the data type setting information and information such as the class name included in the header of the data acquisition request to thereby determine the type of data of an acquisition target (search target) from the data processing unit 60.

When the data to be acquired is structured data (Yes in S2), the query controller 63 searches the memory 61-2 using the key information key (class name, instance ID, time stamp, etc.); and when the structured data to be acquired is accumulated in the memory 61-2 (Yes in S3), the structured data to be acquired is acquired at high speed from a file including the structured data in the memory 61-2 (S4).

When the structured data to be acquired is not accumulated in the memory 61-2 (No in S3), the query controller 63 searches the DB 62a-2 using the time information and key information, copies the file including the structured data to be acquired from the DB 62a-2 to the memory 61-2, and acquires the data to be acquired at high speed from a file including the structured data in the memory 61-2 (S5).

In a case where the data to be acquired is binary data (an image, etc.) (No in S2), the query controller 63 searches the memory 61-2 using the above-mentioned key information; and when the binary data to be acquired is accumulated in the memory 61-2 (Yes in S6), the query controller 63 acquires the binary data from the memory 61-2 at high speed (S7).

When the binary data to be acquired is not stored in the memory 61-2 (No in S6), the query controller 63 searches the file DB 62b-2 via the memory 61-2 using the key information, copies the file including the binary data to be acquired from the file DB 62b-2 to the memory 61-2, and acquires the binary data to be acquired from the memory 61-2 at high speed (S8). The query controller 63 returns the data acquired in S4, S5, S7, or S8 to the application as the data requested by the data acquisition request (S9). In this manner, data can be acquired efficiently by acquiring the data using the key information.

EFFECT OF INVENTION

In the embodiment of the present invention, in accordance with the data characteristic of the IoT system, the data processing system stores or acquires data according to the data type in a device having suitable characteristics. As a result, it is possible to construct a system that can permanently accumulate time-series data and can read latest data that is frequently referred to at high speed.

In addition, by determining the data type by using the data type setting information generated based on the generation origin information of a common data structure, the data processing system 10 is able to maintain consistency between the data type setting information and the I/F of the application and the device, etc., and deal with changes in data structure. In the embodiments of the present invention, it is possible to construct a data processing system that can be connected to applications and devices handling binary data and time-series data, as well as an IoT platform based on this system.

The present invention is not limited to the above embodiments, and can be modified in various manners in practice when implementing the invention without departing from the gist of the invention. Moreover, each of the embodiments may be implemented by being suitably combined to a maximum extent, in which case a combined effect will be obtained. Furthermore, the above embodiments include inventions at various stages, and various inventions can be extracted by an appropriate combination of a plurality of disclosed constitutional requirements.

As a program (software means) that can be executed by a computer, the method described in each embodiment can be distributed by being stored in a storage medium such as a magnetic disk (a floppy disk (trademark), a hard disk, etc.), an optical disk (CD-ROM, DVD, MO, etc.), and a semiconductor memory (ROM, RAM, flash memory, etc.), or by being transmitted by a communication medium. The program stored on the medium side also includes a setting program for causing the software means that is to be executed by the computer (including not only an execution program but also a table structure and a data structure) to be configured in the computer. The computer that realizes the present device reads a program stored in a storage medium, and, in some cases, constructs software means by the setting program, and executes the above-mentioned processing by causing operations to be controlled by the software means. The storage medium referred to in this specification is not limited to distribution, and includes a storage medium such as a magnetic disk and a semiconductor memory provided in a device that is connected via the inside of the computer or a network.

The invention claimed is:

1. A data processing system comprising:
    first and second data storage devices each including a storage medium on which data is permanently storable;
    a data holding device including a storage medium on which the data is storable at a higher speed than the first and second data storage devices; and
    a controller, wherein the controller includes
    a processor; and
    a nonvolatile memory having computer program instructions stored thereon, when executed by the processor, perform to:
    determines a type of data to be processed;
    stores the data to be processed in the first data storage device via the data holding device, where the data storage is in response to a determination that the data to be processed is structured data; and
    stores the data to be processed in the second data storage device via the data holding device, where the data storage is in response to a determination that the data to be processed is unstructured data
    when the data to be processed is the structured data, classifies the structured data stored in the data holding device for each device that generated the data, and collectively stores data that is smaller than the unstructured binary data in the first data storage device together with key information and time information for acquiring the structured data;
    when the data to be acquired is the structured data, searches the data holding device using the key information;
    when the structured data to be acquired is stored in the data holding device, searches the structured data to be acquired from a file including this structured data, and acquires the structured data from the data holding device; and
    when the structured data to be acquired is not stored in the data holding device, copies a file including the structured data to be acquired from the first data storage device to the data holding device using the key information and the time information, and searches and acquires from the data holding device structured data to be acquired from a file including the structured data.

2. The data processing system according to claim 1, further comprising:
    a setting information generation unit for generating setting information to be used for the processor; and
    a storage device that stores generation origin information that is information from which the setting information is generated, wherein the processor determines the type of the data to be processed based on the setting information generated by the setting information generation unit.

3. The data processing system according to claim 2, further comprising:
    a first interface providing unit that provides an interface to be used for an application to the application; and
    a second interface providing unit that provides an interface to be used for a device to the device, wherein
    the setting information generation unit generates the setting information having consistency with the interface to be used for the application and the interface to be used for the device by using the generation origin information.

4. The data processing system according to claim 2, further comprising:
    a first interface providing unit that provides an interface to be used for an application to the application; and
    a second interface providing unit that provides an interface to be used for a device to the device, wherein
    the generation origin information is generation origin information of a common data structure that serves as common information for respectively generating the interface to be used for the application, the interface to be used for the device, and the setting information.

5. The data processing system according to claim 1, wherein the computer program instructions further perform to:
    when the data to be processed is the unstructured data, stores the data to be processed in the data holding device, classifies the unstructured data stored in the data holding device for each device that generated the data, and separately stores data that is larger than the structured data in the second data storage device together with key information for acquiring the unstructured data;
    when data to be acquired is the unstructured data, searches the data holding device using the key information;
    when the unstructured data to be acquired is stored in the data holding device, acquires this unstructured data from the data holding device; and
    when the unstructured data to be acquired is not stored in the data holding device, copies a file including the unstructured data to be acquired from the second data storage device to the data holding device using the key information, and acquires this unstructured data from the data holding device.

6. The data processing system according to claim 1, where the structured data is stored in the first data storage with key information and the unstructured data is stored in the second data storage without key information.

7. The data processing system according to claim 1, wherein the storage medium of the data holding device is further defined as cache.

8. A data processing method implemented in a data processing system that includes first and second data storage devices including a storage medium on which data is permanently storable, and a data holding device including a storage medium capable of storing the data at a higher speed than the first and second data storage devices, the method comprising:
    determining a type of data to be processed;
    storing the data to be processed in the data holding device;
    storing the data to be processed in the first data storage, where the data storage is in response to a determination that the data to be processed is structured data;

when the data to be processed is the structured data, classifies the structured data stored in the data holding device for each device that generated the data, and collectively stores data that is smaller than the unstructured binary data in the first data storage device together with key information and time information for acquiring the structured data;

when the data to be acquired is the structured data, searches the data holding device using the key information;

when the structured data to be acquired is stored in the data holding device, searches the structured data to be acquired from a file including this structured data, and acquires the structured data from the data holding device;

when the structured data to be acquired is not stored in the data holding device, copies a file including the structured data to be acquired from the first data storage device to the data holding device using the key information and the time information, and searches and acquires from the data holding device structured data to be acquired from a file including the structured data;

storing the data to be processed in the second data storage, where the data storage is in response to a determination that the data to be processed is unstructured data;

when the data to be processed is the unstructured data, classifies the unstructured data stored in the data holding device for each device that generated the data, and separately stores data that is larger than the structured data in the second data storage device together with key information for acquiring the unstructured data;

when data to be acquired is the unstructured data, searches the data holding device using the key information;

when the unstructured data to be acquired is stored in the data holding device, acquires this unstructured data from the data holding device; and when the unstructured data to be acquired is not stored in the data holding device, copies a file including the unstructured data to be acquired from the second data storage device to the data holding device using the key information, and acquires this unstructured data from the data holding device.

9. The data processing method according to claim 8, wherein the storage medium of the data holding device is further defined as cache.

10. A data processing system comprising:
first and second data storage devices each including a storage medium on which data is permanently storable;
a data holding device including a storage medium on which the data is storable at a higher speed than the first and second data storage devices; and
a controller, wherein the controller includes
a processor; and
a nonvolatile memory having computer program instructions stored thereon, when executed by the processor, perform to:
determines a type of data to be processed;
stores the data to be processed in the first data storage device via the data holding device, where the data storage is in response to a determination that the data to be processed is structured data; and
stores the data to be processed in the second data storage device via the data holding device, where the data storage is in response to a determination that the data to be processed is unstructured data when the data to be processed is the unstructured data, classifies the unstructured data stored in the data holding device for each device that generated the data, and separately stores data that is larger than the structured data in the second data storage device together with key information for acquiring the unstructured data;

when data to be acquired is the unstructured data, searches the data holding device using the key information;

when the unstructured data to be acquired is stored in the data holding device, acquires this unstructured data from the data holding device; and when the unstructured data to be acquired is not stored in the data holding device, copies a file including the unstructured data to be acquired from the second data storage device to the data holding device using the key information, and acquires this unstructured data from the data holding device.

11. The data processing system according to claim 10, further comprising:
a setting information generation unit for generating setting information to be used for the processor; and
a storage device that stores generation origin information that is information from which the setting information is generated, wherein
the processor determines the type of the data to be processed based on the setting information generated by the setting information generation unit.

12. The data processing system according to claim 11, further comprising:
a first interface providing unit that provides an interface to be used for an application to the application; and
a second interface providing unit that provides an interface to be used for a device to the device, wherein
the setting information generation unit generates the setting information having consistency with the interface to be used for the application and the interface to be used for the device by using the generation origin information.

13. The data processing system according to claim 11, further comprising:
a first interface providing unit that provides an interface to be used for an application to the application; and
a second interface providing unit that provides an interface to be used for a device to the device, wherein the generation origin information is generation origin information of a common data structure that serves as common information for respectively generating the interface to be used for the application, the interface to be used for the device, and the setting information.

* * * * *